Patented Aug. 26, 1941

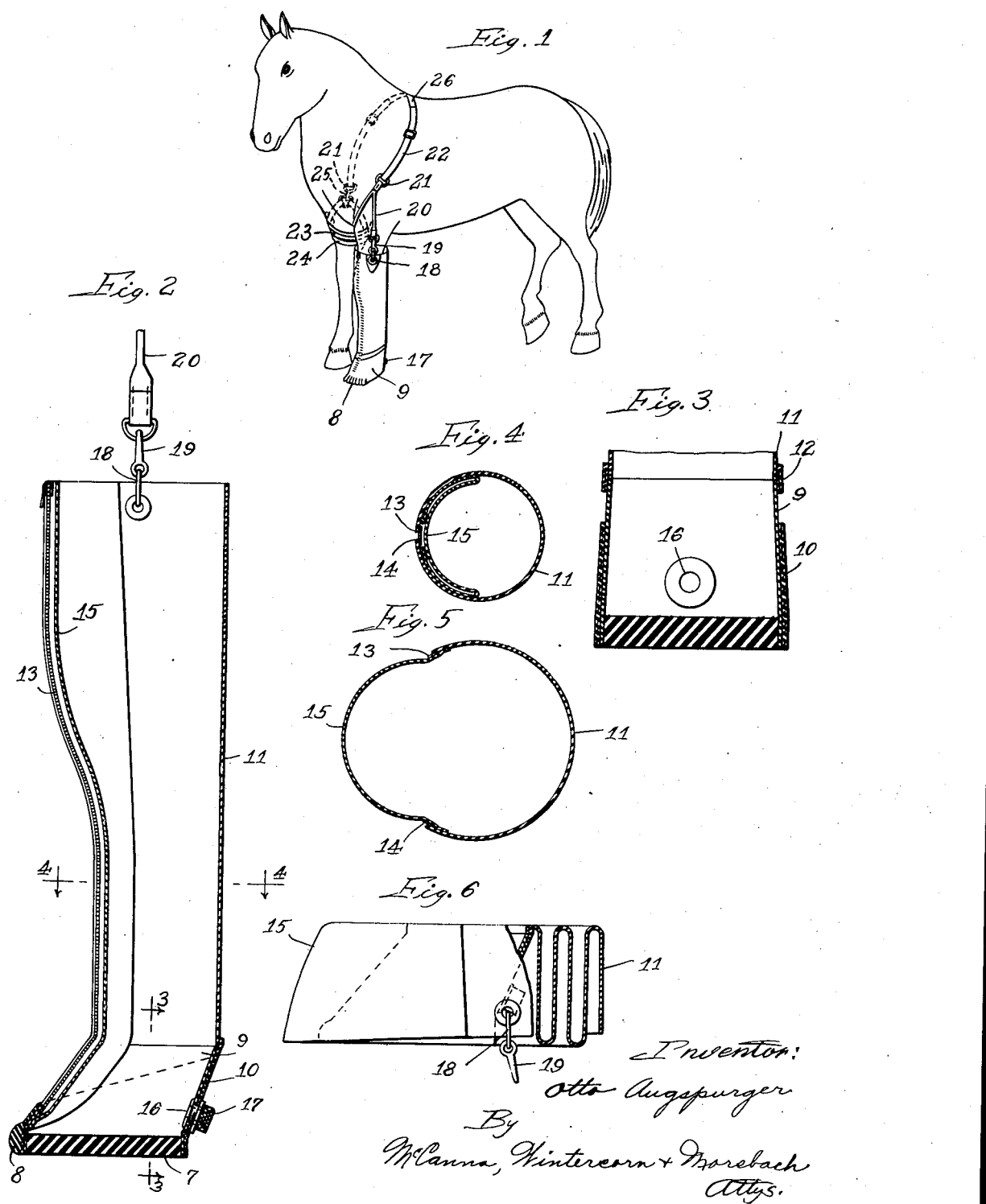

2,253,837

UNITED STATES PATENT OFFICE 2,253,837

EQUINE BOOT

Otto Augspurger, Rockford, Ill.

Application February 12, 1940, Serial No. 318,469

7 Claims. (Cl. 168—2)

This invention relates to therapeutical boots and boot support devices adapted for being fitted to animals such as horses, mules, or cows.

The treament of animal leg diseases especially of the sort that develop above the hoof to which horses are particularly subject is rendered difficult because of the problem of insuring an antiseptic condition at the diseased portion of the leg. Obviously, it is extremely difficult to keep a wound or infection clean under the state of sanitation found in stables, barn yards, pastures, and roads even through various types of wrappings. Also, it is oftentimes desirable to keep the wound or infection covered with an antiseptic or healing solution. It is, therefore, the principal object of my invention to provide a liquid tight boot that may be readily fitted to and supported on an animal without impeding its movements or discomforting it. Obviously, a liquid tight boot will not only retain the desired therapeutical solution but when empty will isolate a portion of the animal's leg so as to maintain a completely antiseptic condition.

Another important object of my invention is to provide a means for making cold or warm applications to a horse's legs without risking the injury or inconvenience that results when the bottom portion of the leg is immersed in a tub of water. It is customary to apply such cold treatment to the lower portions of the legs of race horses in order to induce a vaso-contraction so that the horse will be better able to run. Because race horses are particularly high strung and sensitive, they are very susceptible to sprains or similar injuries that may result from such tub treatment. My invention permits the administration of hot or cold treatments either by filling the boot with warm or cold water or by an irrigation treatment in which water is introduced at the top of the boot and flows downward so as to immerse the leg leaving the boot through an opening provided by the removal of a plug in its bottom portion.

Figure 1 is a perspective view of the boot and supporting harness installed on a horse;

Figure 2 is a longitudinal section of the boot;

Figure 3 is a section on the line 3—3 of Figure 2;

Figure 4 is a transverse section of the boot in a closed position on the line 4—4 of Figure 2;

Figure 5 is a transverse section of the boot in open position showing the distended flap. This section is also taken on the lne 4—4 of Figure 2, and Figure 6 is a side elevation with a cutaway portion showing the boot in a collapsed position in readiness for fitting to a horse's leg.

A boot that is suitable for installation upon a leg of a horse comprises a sole piece 7 and upper members which extend above the horse's knee. The sole piece 7, which is of a heavy rubber composition, is sufficiently durable to withstand pressure exerted by the shoe attached to the horse's hoof under walking or driving conditions. The forward edge of the sole piece is studded with rubber bumper-like projections 8 which act to protect the bottom portion of the boot from tearing or ripping that might be occasioned by any stubbing or stumbling movement of the horse's leg. A rubber covered fabric piece 9 that extends upward to substantially cover the horse's hoof is vulcanized or otherwise secured along its bottom edge to the edge of the sole piece 7. The front portion of this hoof piece 9 is inclined so as to conform to the shape of the hoof in order to fit more snugly. A diagonally cut reinforcing piece 10 of the same material is secured to the hoof piece 9 to give rigidity and strength to this portion of the boot. A leg piece 11 of a rubber covered fabric material that is cut to bulge outwardly at the portion that fits over the knee of the horse extends from the hoof piece 9 to a line above the knee of the horse. The leg piece 11 and hoof piece 9 are secured together at their respective bottom and top edges by vulcanizing or cementing thereto a band 12 that loops around the outside of the boot.

Both the hoof piece 9 and leg piece have vertical front openings extending continuously from a point above the sole piece 7 to the top of the boot. Respective halves 13 and 14 of a slide fastener are secured to the vertical portions of the hoof piece and leg piece and extend along the front opening, thereby providing a means for closing this opening when the boot is on a leg. A thin rubberized fabric flap 15 that extends substantially along the front opening to close the same is secured at either vertical edge to the hoof piece and leg piece inwardly from each half of the slide fastener. By completely closing the opening in the upper parts of the boot, this flap serves to make the entire boot liquid tight.

As illustrated in Figure 6, the boot may be collapsed through moving the slide fastener to the open position. In this manner, the leg piece 11 and flap 15 may be spread aside to permit the hoof to be placed within the hoof piece 9. To complete the installing operation, the leg piece 11 and flap 15 are pulled upward so as to enclose the leg, and the slide fastener is slid along the front opening, thereby closing it. In the closed position, the flap 15 is folded partially around the leg on either side of the slide fastener opening to permit the leg piece to fit snugly about the contour of the leg as illustrated in Figure 4.

As has been mentioned, this boot is designed for the retention of an antiseptic solution or other fluid that might be used in treating a horse. For irrigation treatment and for added convenience in emptying the liquid within the boot so that it may be refilled, or so that it may be more easily removed, the rear portion of the hoof piece is fitted with a drainage plug consisting of a cylinder 16 that has inner and outer flanges for attachment to the boot and an outside cap 17 that fits on the threaded and exterior end of the cylinder.

At the top and on either side, the boot is provided with holes reinforced with grommets and rings 18 through which snaps 19 are attached. These snaps are attached to the ends of a strip 20 which passes through a ring 21 of an adjustable strap 22 that extends over the withers or front shoulders of the horse, and is secured to another strap 23 that loops around the front portion of the opposite leg. This looping strap 23 is provided with a pad 24 where it contacts with the leg to prevent chafing or cutting, and at its upper ends is attached to another ring 21 on adjustable strap 22 by a snap 25. The adjustable strap has a strip of elastic webbing 26 at its center that provides resiliency and flexibility in the strap so that the movements of the horse will be unimpeded and no flesh injury will result through the rubbing of the harness. Where a boot is employed on both front or rear legs, a strap similar to the strip 20 is employed on each boot which is received in each of the rings 21, whereby both boots are supported by the strap 22.

The adjusting means on the strap 22 permit this harness to be adapted to other animals such as cows as well as horses of different sizes. In the foregoing description, the boot and harness assembly has been described as installed upon the front leg and shoulders of a horse; but by virtue of its construction, it may be fitted to and supported on either of the four feet of an animal or a plurality of them to any number of legs. When the boot is fitted to a rear leg, the harness strap passes over the back of the animal on a line forward of its rear shoulders and loops around the opposite rear leg.

While I have shown a specific embodiment of the invention, this is by way of illustration and I do not wish to be limited by the details thereof, except as required by the prior art and the scope of the appended claims, in which

I claim:

1. The combination in an article of the class described, of flexible means for retaining liquid around an animal's leg so that the said leg is immersed, means for supporting the aforesaid flexible means to the leg, and means for draining the fluid from the flexible retaining means without removing the same from the leg.

2. The combination in a boot and harness suitable for attachment to an animal, of a liquid tight flexible boot of non-metallic material enclosing and shaped to fit in closely spaced relation to the hoof and leg of an animal to a point above the knee, an adjustable strap having resilient means therein extending over the back of said animal to support the boot and prevent its collapse, and means for attaching the adjustable strap to the boot to support the same.

3. The combination in a boot and harness suitable for attachment to an animal, of a liquid tight flexible boot enclosing the hoof and leg of the animal, an adjustable strap having resilient means therein extending over the back of said animal, means for attaching the adjustable strap to the boot and to the opposite leg from that on which the boot is fitted, and means at the bottom of the boot for emptying liquid therefrom.

4. The combination in a boot suitable for attachment to an animal, of a liquid tight flexible boot enclosing the hoof and leg of the animal, and means at the bottom of the boot for emptying any liquid therein.

5. In a boot and harness suitable for attachment to an animal, a liquid tight flexible boot enclosing the hoof and leg of the animal, an adjustable strap having resilient means therein extending over the back of said animal, means for attaching and detaching the adjustable strap to and from the boot, and to and from the opposite leg from that on which the boot is fitted and a flap folded and secured within the said boot when the same is fitted to the leg, and means for releasing the said flap so that it may be distended and thereby permit removal of the boot.

6. The combination in an animal boot of a sole of relatively thick and tough flexible material, a somewhat cylindrical leg portion of flexible material secured thereto and extending upwardly shaped to fit and to enclose the leg of the animal to a line above the knee, said leg portion being split from a point adjacent the sole to the top of the leg portion longitudinally of the boot along the front side thereof to provide an opening having opposed edges, means for releasably securing said edges together to confine the leg of the animal therein and to spread the leg portion for removal of the boot said material of the leg portion being flexible for collapse of the leg portion to remove the boot and a flap connecting said edges providing material for spreading of said leg portion, said sole, leg portion and flap being of waterproof material secured together in liquid tight relationship.

7. The combination in a liquid tight animal boot of a sole of a relatively thick rubber composition, a somewhat cylindrical leg portion of flexible rubberized fabric secured thereto and extending upwardly to enclose the leg of the animal to a line above the knee, said leg portion being split longitudinally along the front from a point adjacent the sole to the top of the leg portion to provide an opening having opposed edges, a waterproof flap connecting said edges and extending substantially the length thereof adapted to be folded into the boot when said edges abut said flap preventing egress of liquid from the boot through said opening, and means comprising a slide fastener attached to the opposite sides of said slit for securing said edges together to confine the leg of the animal therein releasable to spread the leg portion and fold the same downward for removal from the leg.

OTTO AUGSPURGER.